United States Patent
Davidson et al.

(10) Patent No.: US 6,947,958 B2
(45) Date of Patent: Sep. 20, 2005

(54) SYSTEM AND METHOD FOR DOCUMENTING COMPOSITE DATA PRODUCTS

(75) Inventors: Alan L. Davidson, Marina Del Rey, CA (US); Amit Agrawal, Santa Monica, CA (US); James Berney, Yorba Linda, CA (US); John McLaughlin, Los Angeles, CA (US); Robert Engle, Los Angeles, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 468 days.

(21) Appl. No.: 09/955,820

(22) Filed: Sep. 19, 2001

(65) Prior Publication Data
US 2003/0055845 A1 Mar. 20, 2003

(51) Int. Cl.$^7$ .............................................. G06F 17/00
(52) U.S. Cl. .................... 707/203; 707/104.1; 707/707; 707/3
(58) Field of Search .............................. 707/5, 1, 6, 8, 707/104.1, 203, 204, 102, 100, 3

(56) References Cited

U.S. PATENT DOCUMENTS

| | | | |
|---|---|---|---|
| 5,574,898 A | * 11/1996 | Leblang et al. ................. | 707/1 |
| 5,752,244 A | * 5/1998 | Rose et al. ...................... | 707/5 |
| 6,119,229 A | * 9/2000 | Martinez et al. ............. | 713/200 |
| 6,240,414 B1 | * 5/2001 | Beizer et al. ................... | 707/8 |
| 6,415,322 B1 | * 7/2002 | Jaye ............................ | 709/224 |
| 6,650,761 B1 | * 11/2003 | Rodriguez et al. ........... | 382/100 |
| 6,675,163 B1 | * 1/2004 | Bass et al. ...................... | 707/6 |

* cited by examiner

Primary Examiner—Alford Kindred
Assistant Examiner—Sana Al-Hashemi
(74) Attorney, Agent, or Firm—Haverstock & Owens LLP

(57) ABSTRACT

A process is provided for documenting the contents of at least one version of a plurality of data products stored in a database, at least one of the products being a composite product having at least a portion of at least one of the data products included therein. The process includes the steps of: creating a state file to be associated with a version of a composite product to be created, the state file specifying a selected version of at least one selected data product to be used in creating the composite product; using the state file to access the selected version of the selected product from the database; creating the version of the composite product by including therein at least a portion of the selected version of the selected product; and generating a state history file associated with the version of the composite product, the state history file indicating that at least a portion of the selected version of the selected product is included within the version of the composite product. The documenting process also includes the steps of: assigning a product name to the composite product; storing the version of the composite product in the database; and storing the state history file in the database. The documenting further includes a step of assigning a version value to the version of the composite product.

33 Claims, 6 Drawing Sheets

| PRODUCT | VERSION |
|---|---|
| PRODUCT_A | PUBLISHED VERSION |
| PRODUCT_B | LATEST VERSION |
| PRODUCT_C | VERSION 25 |
| PRODUCT_D | PUBLISHED VERSION |
| PRODUCT_E | VERSION 30 |

FIG. 5

| PRODUCT | VERSION | REPRESENTATION |
|---|---|---|
| PRODUCT_A | VERSION 8 | DV RESOLUTION |
| PRODUCT_B | VERSION 3 | 50x50 PIXEL RESOLUTION |
| PRODUCT_C | VERSION 25 | TIFF |
| PRODUCT_D | VERSION 11 | JPEG |
| PRODUCT_E | VERSION 30 | DV |

FIG. 6

SYSTEM AND METHOD FOR DOCUMENTING COMPOSITE DATA PRODUCTS

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to documenting the storage of data in a memory storage unit, and more specifically to a system and method for documenting the storage of a composite data product having at least a portion of another data product utilized/included therein.

BACKGROUND OF THE INVENTION

Modem computer network systems commonly provide for many different users to share access to data stored in a memory location such as a database that may be accessed from each of a plurality of user terminals connected to the database via the network. For example, in a local area network (LAN) system, a number of user terminals are connected to a server and a database via the LAN. Examples of data that may be shared by different users include application documents (e.g., word processing documents, graphical image data files), and database records.

Many different types of document management applications, which may be executed either by the server or by each of the user terminals, are commonly used to manage shared access of documents by a plurality of users. Document management systems typically provide functions including restricting access to selected documents, assigning version values to documents, recording the date of a last revision of each document, and recording information indicative of the particular user(s) who last modified each document. Restricting access to specified documents or records is typically accomplished by granting different types of access rights to different users. For example, a typical document management system may be programmed to grant full editing rights to a first group of users who may create and edit documents, grant only viewing rights to a second group of users, and prohibit a third group of users from accessing the documents for any purpose.

Many document management systems also enable users to store additional information associated with each document including a document title, a client associated with the document, an associated matter number, a document type which is usually indicative of the contents of the document, and associated user group information indicative of particular group of users (e.g., an accounting department within an organization) who may be interested in the document. Thus, document management systems provide for generating documentation indicating the contents of documents. Some of this information must be entered manually by a user who creates the document. Other information, such as a last user to edit the document, is automatically documented.

An important problem associated with existing document management systems is that such systems do not provide adequate documentation and management of composite documents which include data derived from other documents. In many different industries, including the motion picture industry and the music industry, it is necessary to manage a plurality of media products (e.g., a media data file including computer graphical information, video data, audio data, etc.) stored in a database. These media products may include composite media products. Composite media products are composed of at least a portion of at least one other media product which is utilized/included therein. Each of the composite media products may be generated by different users who may act as producers of media products and/or consumers of media products as further explained below.

As an example, a motion picture production company typically includes many different departments each having a number of users who generate different types of media products to be used in generating a film having computer generated imagery. The departments typically include: a film department that generates products including film resolution plates; a film input/output (I/O) department that produces digital plates that are digitally scanned from the film resolution plates; a modeling department that generates model products including geometric model descriptions of objects to be rendered; an animation department that generates products including animated models; a texture painting department that generates products having texture maps applied to models; and technical directors who generate media products having correctly applied lighting and textures for rendering. Users within each of these departments typically act as both consumers and producers of media product by "consuming" a selected version of a selected product created by another user, and producing a composite media product utilizing the selected version of the selected product. Therefore, each of the users may generate composite media products using specified versions of specified products created by other users.

As an example, a modeler may generate several versions of a model product including geometric model descriptions of a sphere, a texture painter may generate several different versions of a texture paint product, and a technical director may create several different versions of a texture painted sphere composite product. Subsequently, a visual effects supervisor may view several different versions of the texture painted sphere composite product, and prefer the version of the sphere model in a version of the composite product and the version of the texture in a different version of the composite product. The users must then determine the preferred version of the texture product and the preferred version of the sphere product.

The task of determining selected versions of selected products included in a composite product becomes increasingly difficult as the number of products included in the composite product increases and also as the number of versions of each of the products increases. The complexity of this problem increases exponentially when a composite product includes several other composite products each of which is also a composite product. As another example, a technical director may view several different versions of a composite media product including data describing an image of a character such as the face of a human, each version of the composite product including different versions of model products, texture paint products, lighting products, etc., wherein each of these products is also a composite product. The technical director may then determine that some particular aspect of a first version of a media product such as the eyes of the character are preferable, and determine that some particular aspects of a second version of the composite media product (for example, the mouth of the character) are preferable. Because the composite product contains a plurality of other composite products, the task of determining the products having the preferred features can be very difficult.

The task of determining selected versions of selected products included in a composite product becomes even more complex when producers generate different representations of a product in different formats. A representation of a product is a particular embodiment of a product that can potentially be stored in a few different ways. For example, for an image product, two different representations will be (a) a digital image that can be displayed on the computer and (b) the same image on a piece of film. Conceptually they are the same product having two different embodiments. Representations are utilized/included in this system to make products, resolution, colorspace and file format invariant.

What is needed is a system and method for documenting the contents of each of a plurality of composite media products in order to be able to determine the version of each media product utilized to create the composite media product.

What is also needed is a system and method for managing stored access of the media products, and for distributing the media products between different producers and consumers.

SUMMARY OF THE INVENTION

In view of the foregoing, an embodiment of the present invention provides a process of documenting the contents of at least one version of a plurality of data products stored in a database, at least one of the products being a composite product having at least a portion of at least one of the data products utilized therein.

In particular, the process includes the steps of: creating a state file to be associated with the process of the composite product to be created, the state file specifying either at least one selected version of a composite product to be used in creating the product or stating that the published or latest version of the aforementioned composite product be utilized; using the state file to access the selected version of the selected product form the database; creating the version of the composite product by utilizing at least a portion of the selected version of the selected product; and generating a state history file associated with the version of the composite product, a state history file indicating that a specific version of the selected version was utilized to create the composite media product. Note that the state history file does not have a mention of published or latest.

The documenting process also includes the steps of: assigning a product name to the composite product; storing the version of the composite product in the database; and storing the state history file in the database. The documenting further includes a step of assigning a version value to the version of the composite product.

Each of the products has publishing information associated therewith, the publishing information indicating a currently published one of the versions of the product. In an embodiment, the publishing information further indicates previously published versions of the product. A user interface is provided to enable a user to indicate the selected version of the selected product by specifying the currently published version of the selected product. If the state file specifies the currently published version of the selected product, the process further includes the step of determining which version of the selected product is currently published. The user interface also enables a user to indicate the selected version of the selected product by specifying a version of the selected product. If the state file specifies a latest version of the selected product, the process further includes the step of determining which version of the selected product is the latest version.

Note that any of the products indicated in a state history file may also be a composite product that has its own associated state history file. In this case, a plurality of state history files would be used to determine the overall contents of the composite product having other composite products included therein.

An important advantage of the system and method for documenting the contents of composite media products in accordance with the present invention is that the state history files provide an indication of the contents of associated composite media products having other products included therein.

These and other features and advantages of the present invention will be understood upon consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWING

The following detailed description, given by way of example, and not intended to limit the present invention solely thereto, will best be understood in conjunction with the accompanying drawings in which:

FIG. 5 is a block diagram generally illustrating a state file used in accordance with the documenting process, the state file specifying a selected version of at least one selected media product to be used by a producer in creating a composite media product by including the selected versions of the selected products; and FIG. 6 is a block diagram generally illustrating a state history file generated in accordance with the documenting process of the present invention, the state history file being associated with a version of a composite media product and indicating the versions of other products that are included within the associated version of the associated composite product.

DETAILED DESCRIPTION OF THE INVENTION

Figure 1:
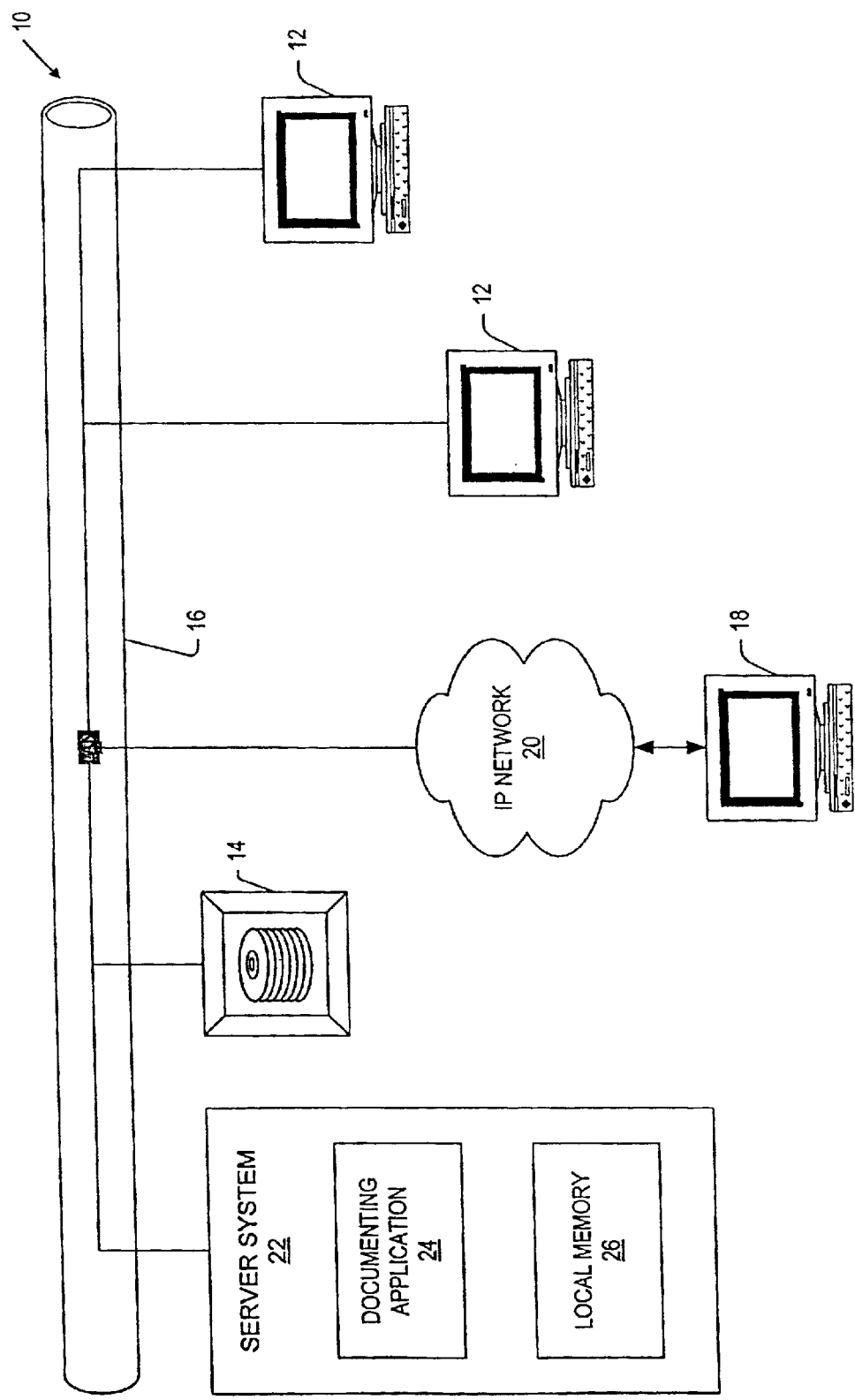
FIG. 1 is a block diagram generally illustrating a network system including a plurality of user terminals connected to a database providing for storage of different versions of media products accessed by different users of the system in accordance with a documenting process of the present invention.

FIG. 1 shows a block diagram generally illustrating a network system at 10 including a plurality of user terminals 12 each being communicatively coupled with a database 14 via a local area network (LAN) 16. The database 14 provides for storage of at least one version of a plurality of media products each including a portion of media data. The media data of each of the media products may include computer generated imagery (CGI) data, video data, and audio data. Each version of each of the media products may be stored in any of a wide variety of data formats including standard formats that are commonly used for the associated type of data.

Additional user terminals 18 may access the database 14 via an internet protocol (IP) network 20 communicatively coupled with the LAN 16. In one embodiment, each of the user terminals 12, 18 is a work station providing for execution of at least one application such as a software tool for generating and editing media products.

Each of the user terminals 12, 18 and the database 14 is also communicatively coupled with a server computer system 22 via the LAN. In accordance with the present invention, a media product documenting application 24 executed by the server system 22 provides for documenting information indicative of the contents of each versions of each of the media products stored in the database 14. As further explained below, the documenting application 24 provides a user interface at each of the user terminals 12, 18 enabling users to provide input that is used to generate the documenting information.

At least a portion of the media products stored in the database 14 are composite media products each having at least a portion of at least one other media product included therein. Each of the composite media products may be generated by different users at the terminals 12, 18 who may act as producers of the media products and/or consumers of media products. Each of the users may generate a version of a composite media product using selected versions of selected products.

The documenting application 24 provides for generating and storing documenting information associated with each of the media products. As further explained below, the documenting information includes a state history file associated with each composite media product, the state history file indicating the selected versions of the selected products that are included within the associated composite media product. In one embodiment, the documenting information associated with each product is stored in the database 14 along with the associated product. In an alternative embodiment, the documenting information is stored in a local memory unit 26 of the server system 22.

The network system 10 may be owned and operated by an organization engaged in the production of media products. As an example, the system 10 may be operated by a motion picture production company including many different departments each having a number of users who generate different types of media products to be used ultimately in generating a final product in the form of a motion picture.

Figure 2A:
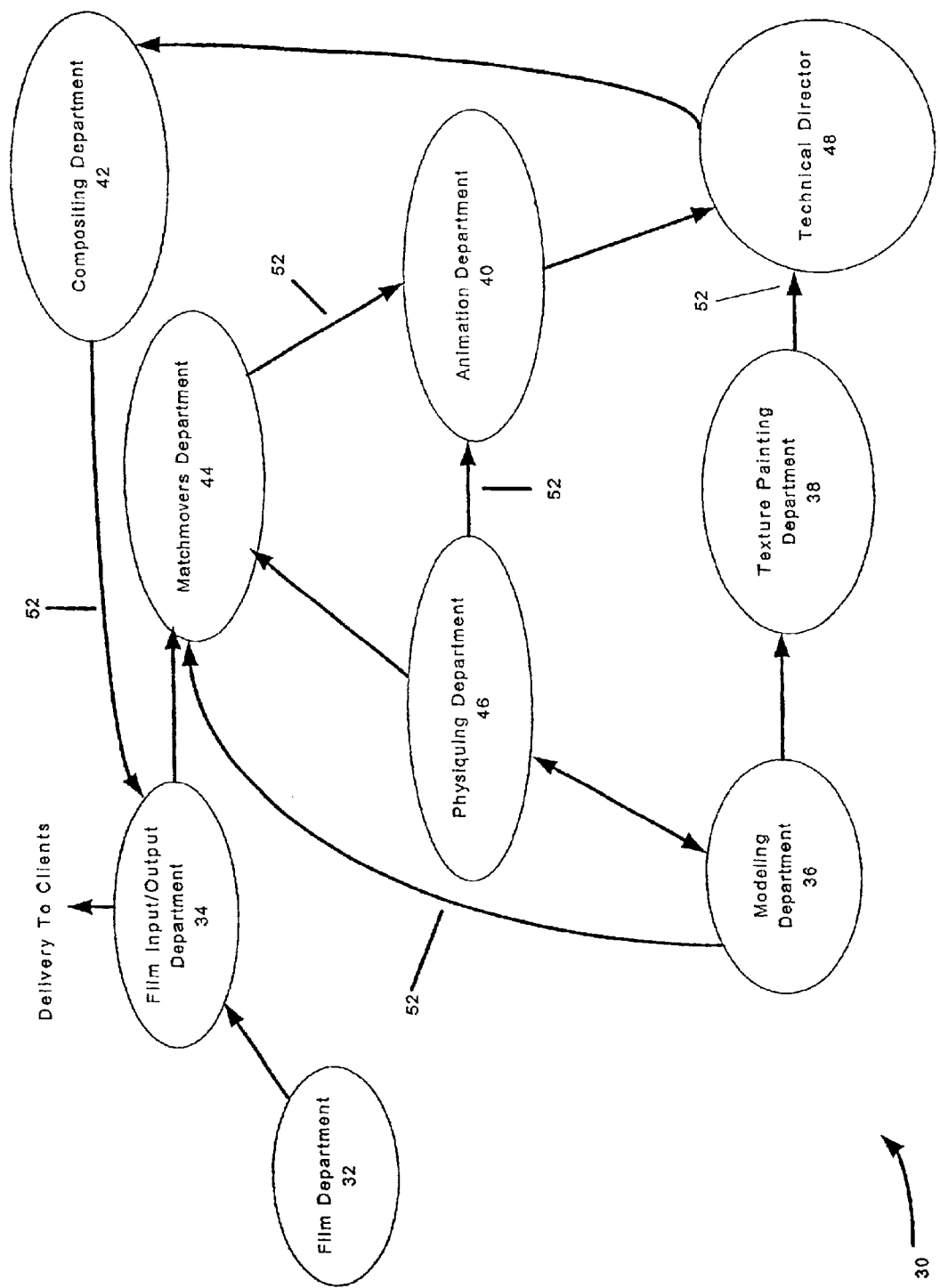
FIG. 2A is a block diagram generally illustrating a plurality of exemplary user groups that share access to the media products, each group being capable of functioning as both a producer and a consumer of the media products in accordance with the documenting process.

FIG. 2A shows a block diagram generally illustrating a plurality of operative user groups at 30 each being capable of functioning as both a producer and a consumer of media products generated at associated user terminals 12, 18 (FIG. 1) and stored in the database 14. In the depicted example, each of the user groups is a department in a motion picture production company. Each of the departments includes a number of users who generate different types of media products to be used in generating a final product which is a motion picture film in this example. The departments include: a film department 32 that generates products including film resolution plates; a film input/output (I/O) department 34 that generates products including digitally scanned plates created from the film resolution plates; a modeling department 36 that generates model products including geometric descriptions of objects to be rendered; a texture painting department 38 that generates products including texture maps to be applied to selected models; an animation department 40 that generates products including animated models; a compositing department 42; a match movers department 44 that generates products in which the motion of the camera matches subject matter shot on film; a physiquing department 46 that generates products having objects that move properly; and technical directors 48 who generate composite products having correctly applied lighting and textures for rendering. Each user within each of these departments may act as both a consumer and a producer of media products stored in the database 14 (FIG. 1) by "consuming" a selected version of a selected product created by another user of the same or a different department, and producing a composite media product including the selected version of the selected product included therein. Therefore, each of the users may generate composite media products using selected versions of selected products created by other users.

Each of a plurality of lines 52 illustrates a passing of a media product from one of the depicted departments to another. Media products stored in the database 14 (FIG. 1) are "passed" between users of the network system 10 (FIG. 1) when a first user accesses a version of a product produced by a second user from the database for consumption, that is for use in generating a composite media file by including at least a portion of the accessed product therein.

The producer of a product, or any other using having the required editing rights, may designate a particular version of a product as being "published". In an ideal system, only published versions of the product would be passed between users of the network system and consumed, that is accessed from the database 14 (FIG. 1) and used to generate another composite media product, by other users of the network system 10 (FIG. 1). However, in practice, consumers of the different products may wish to select a published version, a latest version, or any older version of any one of the products. Therefore, in one embodiment of the present invention, unpublished versions of media products may be passed between users in accordance with the documenting process of the present invention as further explained below.

As an example, users of the modeling department 36 may generate several versions of a model product including geometry data describing an object. Users in the texture painting department 38 may then access a selected version of the model product and generate several different versions of a texture painted composite media product each comprising an associated texture map applied to an associated object described in the selected version of the selected model product. Subsequently, a visual effects supervisor may view several different versions of the texture painted composite product, and decide that a particular version of the texture paint included in a first version of the composite media product is preferred, and that a particular version of the texture paint included in a second version of the composite media product is preferred. The visual effects supervisor may then request the texture painting department 38 to generate a current version of the composite product including the preferred versions of each of the object and texture paint. As further explained below, the documenting information generated by the application 24 enables the texture painting department 38 to determine which version of which model product includes the preferred object product included in the composite product.

Figure 2B:
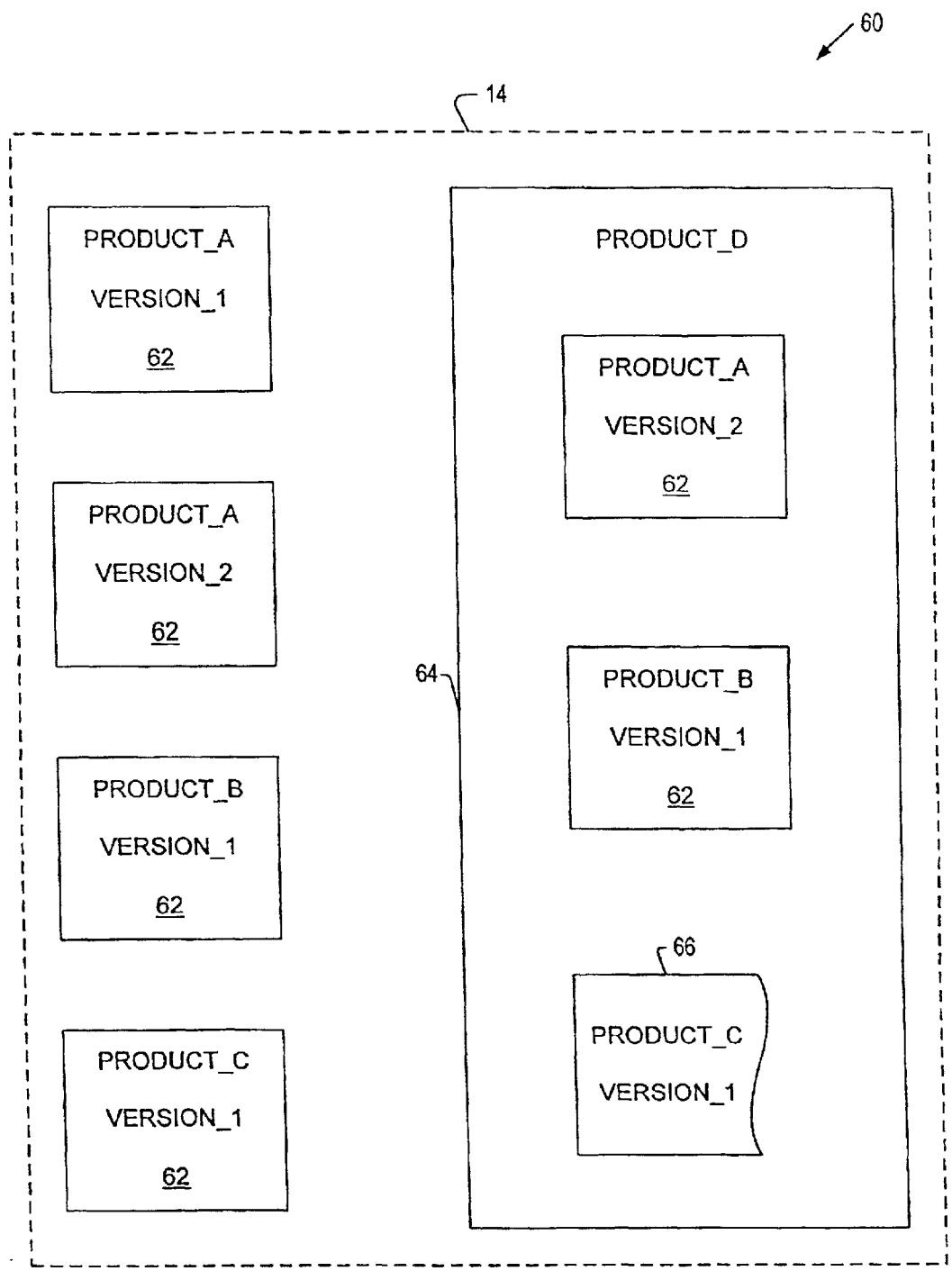
FIG. 2B is a block diagram generally illustrating a plurality of media products stored in the database of FIG. 1, at least one of the media products being a composite media product having at least a portion of at least one other media products included therein.

FIG. 2B is a block diagram generally illustrating a plurality of media products 62 (FIG. 2B) stored in the database 14 (FIG. 1), at least one of the media products being a composite media product 64 having at least a portion 66 of at least one other media product included therein. In the depicted example, the database 14 includes stored therein: two versions of a first product 62 designated PRODUCT_A_VERSION_1 and PRODUCT_A_VERSION_2 respectively; one version of each of a second and a third product 62 designated PRODUCT_B and PRODUCT_C respectively; and a composite media product 64 designated PRODUCT_D which was generated by including the second version of PRODUCT_A, the first version of PRODUCT_B, and a portion of the first version of PRODUCT_C shown at 66.

Each of the media products 62, 64 has publishing information associated therewith, the publishing information indicating a currently published one of the versions of the product, and all previously published versions of the product. In one embodiment, the publishing information is stored in the local memory unit 26 (FIG. 1) of the server system. In another embodiment, the publishing information associated with each version of each of the products is stored in the database 14 (FIG. 1) along with the associated product. Also in an embodiment, users of the network system 10 (FIG. 1) are restricted from modifying all published versions of media products.

Figure 3:
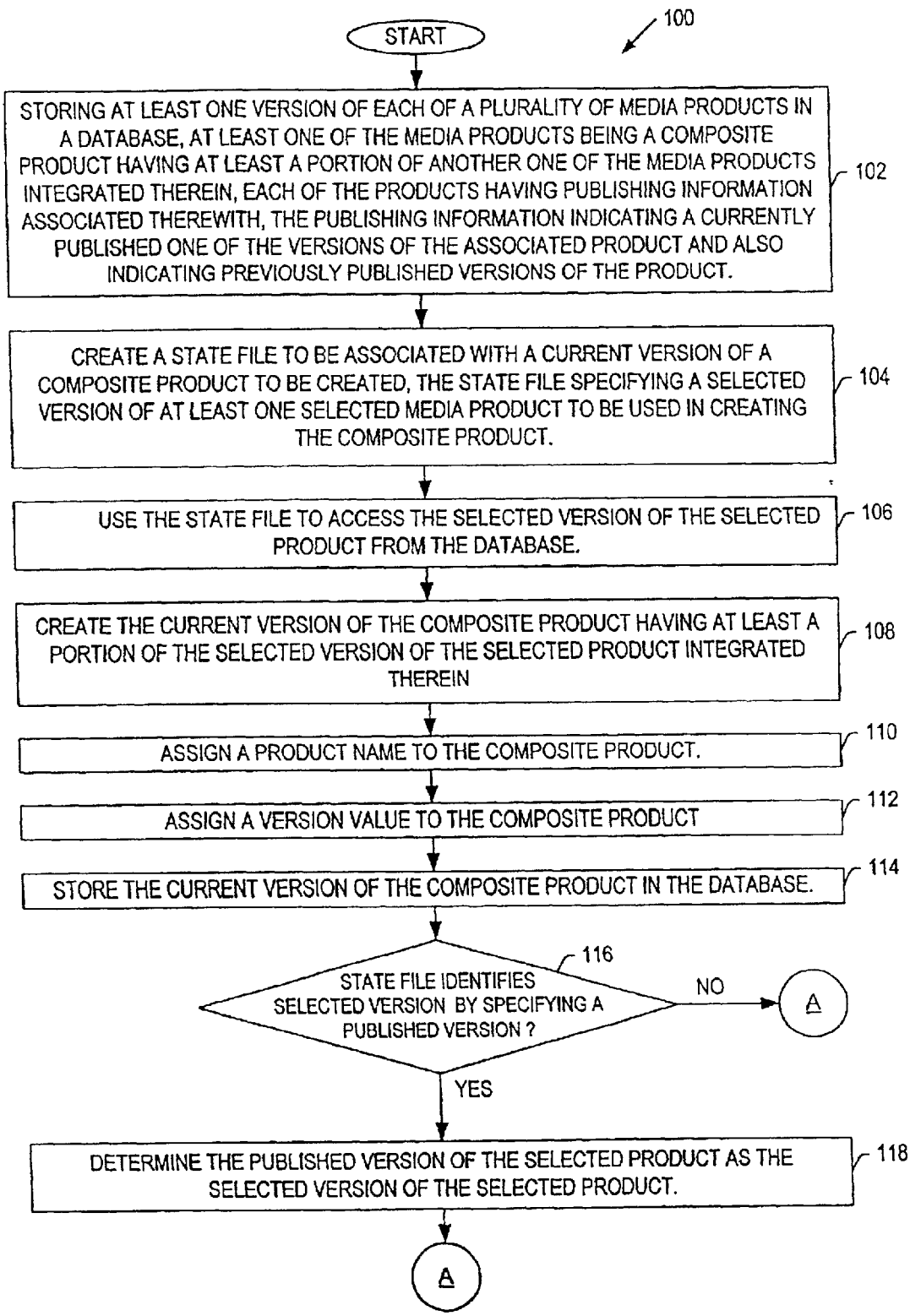
FIGS. 3 and 4 are flow diagrams generally illustrating steps of the documenting process of the present invention.

FIG. 3 shows a flow diagram generally illustrating a process at 100 in accordance with the present invention for documenting the contents of at least one version of a plurality of media products stored in the database 14 (FIG. 2B), at least one of the products being a composite media product 64 (FIG. 2B) having at least a portion of at least one media product included therein. As further described below, some specified steps of the process 100 are executed by a documenting system implemented as computer readable instructions of the documenting application 24 (FIG. 1) executed by the server system, while other steps are implemented by a user of the documenting system who accesses media files from the database 14 (FIG. 1) via one of the user terminals 12, 18 (FIG. 1). In an alternative embodiment, those steps of the process 100 specified to be executed by the server system may alternatively be executed by each of the user terminals 12, 18 (FIG. 1).

The process 100 begins with a step 102 in which at least one version of a plurality of media products is stored in a database, at least one of the products being a composite media product. Each of the products has publishing information associated therewith, the publishing information indicating a currently published one of the versions of the associated product and also indicating previously published versions of the product. From step 102, the process proceeds to step 104 in which the documenting system creates a state file to be associated with a version of a composite product 64 (FIG. 2B) to be created, the state file specifying a selected version of at least one selected media product 62, 64 (FIG. 2B) to be used in creating the composite product. Note that the selected media product may be another composite product. In the preferred embodiment, the system provides a user interface at one of the terminals 12, 18 (FIG. 1) enabling a user to provide input at the terminal to specify the selected versions of selected media products for the state file to be used by the user as a producer to specify products to be consumed in the course of producing a composite product 64 (FIG. 2B). For the texture painting example, a user may use the interface to create a state file specifying a selected geometry product including geometry data defining an object to be used in creating a composite texture painted product including the object having texture painting applied to it. As further explained below, the user interface for creating the state file enables the user to specify the "currently published version" of a selected product, a "latest version" of the selected product, or a selected version value indicating a particular selected version of the selected product.

In step 106, the documenting system uses the state file created in step 104 to access the selected versions of the selected products from the database 14 (FIG. 1). In step 108, the user creates a current version of a composite product 64 (FIG. 2B) by using and/or including therein at least a portion of the selected versions of the selected products. In step 110, a product name is assigned to the composite product. In one embodiment, the documenting system prompts the user to specify a product name for the composite product generated in step 108. However, the product name may also be assigned a default product name by the documenting system.

In step 112, a version value is assigned to the composite product. In the preferred embodiment, the version value is assigned automatically by the documenting system which determines the version value of the previous highest, or latest, version and assigns a next highest version value to the newly created product. In step 114, the current version of the composite product is stored in the database 14 (FIG. 1) and a state history file associated with the current version of the composite product is simultaneously created as further explained below.

Figure 4:
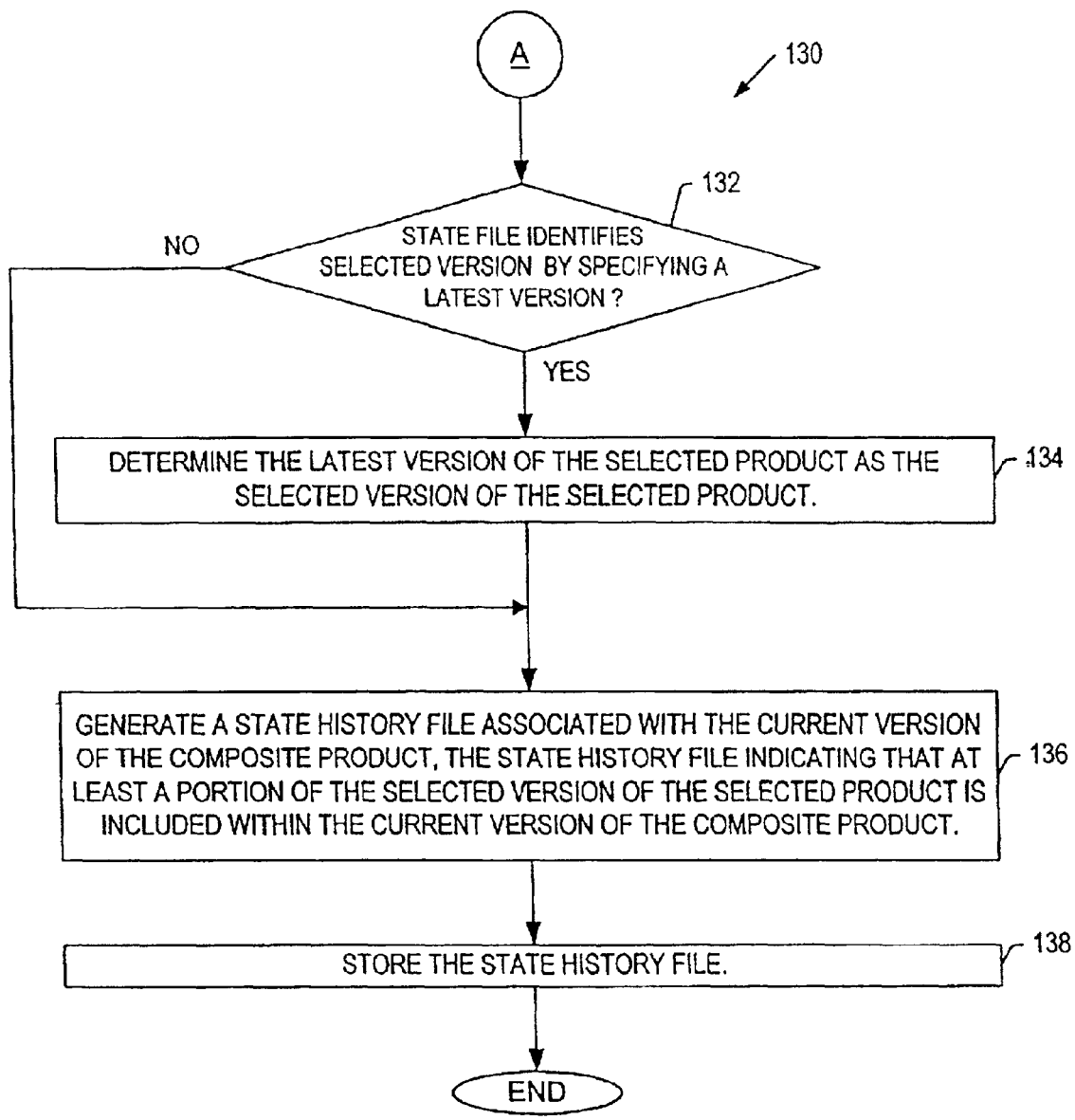

From step 114, the process proceeds to 116 at which the system determines whether the state file created in step 104 specifies a "currently published version" of a selected product, and if so, the process proceeds to step 118 in which the system determines which version of the associated selected product is currently published, after which the process proceeds to "A" (to FIG. 4). If the state file does not specify a "currently published" version, the process proceeds directly to "A".

FIG. 4 shows a flow diagram generally illustrating further steps at 130 of the process 100 (FIG. 3). The depicted steps proceeds from "A" (from FIG. 3) to 132 at which the system determines whether the state file specifies a "latest version" of a selected product, and if so, the process proceeds to step 134 in which the system determines which version of the selected product is the latest version, after which the process proceeds to step 136 which is further explained below. If the state file does not specify a "latest version", the process proceeds directly to step 136.

In step 136, the system generates a state history file associated with the current version of the composite product, the state history file indicating that at least a portion of the selected versions of the selected products are included within the current version of the composite product. Each state history file is generated based on the information indicated in the associated state file used to create the associated composite product. In step 138, the system stores the state history file. The contents and the use of the state history file are further explained below.

FIG. 5 shows a block diagram generally illustrating a state file at 150 in accordance with the present invention, the state file 150 including at least one entry 152 having a product field 154 specifying a selected one of the media products 62, 64 (FIG. 2B) to be used in creating an associated composite media product, and a version field 156 specifying a selected version of the selected media product indicated in the product field 154. As mentioned above, when creating a state file in step 104 (FIG. 3), a user may select a published version, a latest version, or any specified version of any one of the products. The state file 150 is created for the associated composite product. Note that the state file 150 may be modified by a user to select different versions of different media products to be used in creating a different version of the associated composite product.

FIG. 6 shows a block diagram generally illustrating a state history file at 180 in accordance with the present invention, the state history file being associated with a version of a composite media product 64 (FIG. 2B). The state history file 180 includes at least one sub-product entry 182 having: a product field 184 specifying a selected one of the media products 62, 64 (FIG. 2B) that was used in creating the associated versions of the associated composite media product; a version field 186 specifying the version of the associated media product indicated in the product field 184; and a representation field 188 specifying a representation type of the associated media product indicated in the product field 184. In the depicted example, the state history file 180 is used to indicate that an associated version of an associated composite media file was created by including at least a portion of each of: a DV standard resolution format representation of version 8 of a PRODUCT_A; a 50×50 pixel resolution format representation of version 3 of a PRODUCT_B; etc.

In the preferred embodiment of the present invention, users are prohibited from modifying state history files. Note that at least one of the products indicated in the product fields 184 may also be a composite product that has its own associated state history file. In this case, a plurality of state history files would be used to determine the overall contents of the composite product having other composite products included/utilized therein.

Various other modifications and alterations in the structure and method of operation of this invention will be apparent to those skilled in the art, without departing from the scope and spirit of the invention. Although the invention has been described in connection with specified preferred embodiments, it should be understood that the invention as claimed should not be unduly limited to such specific embodiments. It is intended that the following claims describe the scope of the present invention and that the structures and methods within the scope of these claims and their equivalents be covered thereby.

What is claimed is:

1. A process of documenting the contents of at least one version of a plurality of data products stored in a database, at least one of said products being a composite product having at least a portion of said data products included therein, the process comprising the steps of:

creating a state file to be associated with a version of a composite product to be created, said state file specifying a selected version of at least one selected data product to be used in creating said composite product;

using said state file to access said selected version of said selected product from the database;

creating said version of said composite product by including therein at least a portion of said selected version of said selected product; and generating a state history file associated with said version of said composite product, said state history file indicating that at least a portion of said selected version of said selected product is included within said version of said composite product.

2. A process as recited in claim 1 further comprising the steps of:

assigning a product name to said composite product;

storing said version of said composite product in the database; and storing said state history file in the database.

3. A process as recited in claim 1 further comprising the step of assigning a version value to said version of said composite product.

4. A process as recited in claim 1 wherein each of said products has publishing information associated therewith, said publishing information indicating a currently published one of said versions of said product.

5. A process as recited in claim 4 wherein said publishing information further indicates previously published versions of said product.

6. A process as recited in claim 4 wherein said state file identifies said selected version of said selected product by specifying the currently published version of said selected product, said process further comprising the step of:

if said state file specifies the currently published version of said selected product, determining which version of said selected product is currently published.

7. A process as recited in claim 1 wherein said state file identifies said selected version of said selected product by specifying a latest version of said selected product, said process further comprising the step of:

if said state file specifies the latest version of said selected product, determining which version of said selected product is the latest version.

8. A process as recited in claim 4 further comprising the step of prohibiting users from modifying said currently published version.

9. A process as recited in claim 2 wherein said state file may be modified by a user.

10. A process as recited in claim 2 further comprising the step of prohibiting users from modifying said state history file.

11. A process as recited in claim 1 wherein said state history file is a first state history file, wherein said selected data product is a composite data product having at least a portion of a version of a data product included therein, and wherein said selected product has a second state history file associated therewith, said second state history file indicating said version of said data product included within said selected data product, said first and second state history files providing an indication of the contents of said version of said composite product.

12. A process as recited in claim 1 wherein a first one of said products comprises a first representation of a particular version of a particular one of said products, and a second one of said products comprises a second representation of said particular version of said particular product.

13. A process as recited in claim 12 wherein said state history file associated with said version of said composite product further indicates a type of representation embodying said selected version of said selected product that is included within said associated composite product.

14. A process of documenting the contents of at least one version of a plurality of data products stored in a database, at least one of said data products being a composite data product having at least a portion of said data products included therein, the process comprising the steps of:

providing a user interface enabling a user to indicate a selected version of at least one selected data product to be used by a user in creating a composite product;

receiving user input indicating a selected version of at least one selected data product;

creating a state file based on said selected version of said selected data product, said state file for specifying said selected version of said selected data product;

using said state file to access said selected version of said selected product from the database;

providing a user interface enabling a user to indicate that said version of said composite product has been created by including therein at least a portion of said selected version of said selected product;

receiving user input indicating that said version of said composite product has been created; and generating a state history file associated with said version of said composite product, said state history file indicating that at least a portion of said selected version of said selected product is included within said version of said composite product.

15. A process as recited in claim 14 further comprising the steps of:

providing a user interface enabling the user to specify a product name associated with said composite product;

storing said version of said composite product in the database; and storing said state history file in the database.

16. A process as recited in claim 14 further comprising the step of assigning a version value to said version of said composite product.

17. A process as recited in claim 14 wherein each of said products has publishing information associated therewith, said publishing information indicating a currently published one of said versions of said product.

18. A process as recited in claim 17 wherein said step of providing a user interface enabling a user to indicate a selected version of at least one selected data product includes enabling said user to identify said selected version of said selected product by specifying the currently published version of said selected product, said process further comprising the step of:

if said state file specifies the currently published version of said selected product, determining which version of said selected product is currently published.

19. A process as recited in claim 14 wherein said step of providing a user interface enabling a user to indicate a selected version of at least one selected data product includes enabling said user to identify said selected version of said selected product by specifying a latest version of said selected product, said process further comprising the step of:

if said state file specifies the latest version of said selected product, determining which version of said selected product is the latest version.

20. A system for documenting the contents of at least one version of a plurality of data products stored in a database, at least one of said products being a composite product having at least a portion of at least one of said data products included therein, said system comprising:

means for creating a state file to be associated with a version of a composite product to be created, said state file specifying a selected version of at least one selected data product to be used in creating said composite product;

means for using said state file to access said selected version of said selected product from the database;

means for creating said version of said composite product by including therein at least a portion of said selected version of said selected product; and means for generating a state history file associated with said version of said composite product, said state history file indicating that at least a portion of said selected version of said selected product is included within said version of said composite product.

21. A machine readable storage device having stored therein encoding instructions for executing a process of documenting the contents of at least one version of a plurality of data products stored in a database, at least one of said data products being a composite data product having at least a portion of at least one of said data products included therein, comprising the steps of:

creating a state file to be associated with a version of a composite product to be created, said state file specifying a selected version of at least one selected data product to be used in creating said composite product;

using said state file to access said selected version of said selected product from the database;

creating said version of said composite product by including therein at least a portion of said selected version of said selected product; and generating a state history file associated with said version of said composite product, said state history file indicating that at least a portion of said selected version of said selected product is included within said version of said composite product.

22. A machine readable storage device as recited in claim 21 further comprising the steps of:

assigning a product name to said composite product;

storing said version of said composite product in the database; and storing said state history file in the database.

23. A machine readable storage device as recited in claim 21 further comprising the step of assigning a version value to said version of said composite product.

24. A machine readable storage device as recited in claim 21 wherein each of said products has publishing information associated therewith, said publishing information indicating a currently published one of said versions of said product.

25. A machine readable storage device as recited in claim 21 wherein said publishing information further indicates previously published versions of said product.

26. A machine readable storage device as recited in claim 25 wherein said state file identifies said selected version of said selected product by specifying the currently published version of said selected product, said process further comprising the step of:

if said state file specifies the currently published version of said selected product, determining which version of said selected product is currently published.

27. A machine readable storage device as recited in claim 21 wherein said state file identifies said selected version of said selected product by specifying a latest version of said selected product, said process further comprising the step of:

if said state file specifies the latest version of said selected product, determining which version of said selected product is the latest version.

28. A machine readable storage device as recited in claim 21 further comprising the step of prohibiting users from modifying said currently published version.

29. A machine readable storage device as recited in claim 21 wherein said state file may be modified by a user.

30. A machine readable storage device as recited in claim 22 further comprising the step of prohibiting users from modifying said state history file.

31. A machine readable storage device as recited in claim 21 wherein said state history file is a first state history file, wherein said selected data product is a composite data product having at least a portion of a version of a data product included therein, and wherein said selected product has a second state history file associated therewith, said second state history file indicating said version of said data product included within said selected data product, said first and second state history files providing an indication of the contents of said version of said composite product.

32. A machine readable storage device as recited in claim 21 wherein a first one of said products comprises a first representation of a particular version of a particular one of said products, and a second one of said products comprises a second representation of said particular version of said particular product.

33. A machine readable storage device as recited in claim 32 wherein said state history file associated with said version of said composite product further indicates a type of representation embodying said selected version of said selected product included within said associated composite product.

* * * * *

UNITED STATES PATENT AND TRADEMARK OFFICE
CERTIFICATE OF CORRECTION

PATENT NO.         : 6,947,958 B2
APPLICATION NO. : 09/955820
DATED                 : September 20, 2005
INVENTOR(S)       : Alan L. Davidson et al.

It is certified that error appears in the above-identified patent and that said Letters Patent is hereby corrected as shown below:

<u>Title page,</u>
Item [75], Inventors, add -- Sam Richards, Los Angeles, CA (US) --.

Signed and Sealed this

Twenty-seventh Day of June, 2006

JON W. DUDAS
*Director of the United States Patent and Trademark Office*